Jan. 20, 1959 L. O. REICHELT 2,869,128

DEVICE FOR INSERTING L-SHAPED TERMINALS INTO PRINTED CIRCUIT BOARDS

Filed March 6, 1957 3 Sheets-Sheet 1

INVENTOR
L. O. REICHELT
BY C. B. Hamilton
ATTORNEY

INVENTOR
L. O. REICHELT
BY C. B. Hamilton
ATTORNEY

INVENTOR
L. O. REICHELT
BY C. B. Hamilton
ATTORNEY

United States Patent Office 2,869,128

Patented Jan. 20, 1959

2,869,128

DEVICE FOR INSERTING L-SHAPED TERMINALS INTO PRINTED CIRCUIT BOARDS

Lester O. Reichelt, Downers Grove, Ill., assignor to Western Electric Company, Incorporated, New York, N. Y., a corporation of New York Application March 6, 1957, Serial No. 644,257

9 Claims. (Cl. 1—1)

This invention relates to terminal inserting fixtures and more particularly to a device for inserting L-shaped terminals into perforated printed circuit boards.

An object of the invention is to provide an improved device for inserting L-shaped terminals into printed circuit boards.

A device illustrating certain features of the invention for inserting L-shaped terminals into perforated printed circuit boards may include a carrier for supporting the printed circuit board thereon and moving it horizontally to an inserting position with a selected perforation in the board aligned with a predetermined vertical axis. A ram on the device has a driving head yieldably mounted on the end thereof for vertical movement therewith and for limited movement relative thereto to a normal extended position and the head has a horizontal aperture for receiving one leg of the terminal and it has a vertical grooved surface for receiving and aligning the other leg in the predetermined vertical axis and with the perforation in the circuit board. As the ram is lowered, the movement of the driving head is temporarily arrested by a spring in its path and as the ram continues its movement a terminal retaining finger on the ram is moved into engagement with the vertical leg of the terminal to lock it in vertical position on the driving head and the ram then imparts movement to the driving head and the terminal to force the vertical leg of the terminal into the board. A latch holds the driving head in its lower position as the ram is raised a limited distance sufficient for the retaining finger thereon to uncover the terminal, after which the carrier and the circuit board thereon are retracted to withdraw the horizontal leg of the terminal from the driving head and then to actuate the latch to release the driving head and the ram for further upward movement.

Other objects and advantages of the invention will become apparent by reference to the following detailed description thereof and the accompanying drawings, illustrating a preferred embodiment thereof, in which Fig. 1 is a fragmentary side elevational view of the terminal inserting device showing the parts thereof in a normal inoperative position;

Figures 7, 8:
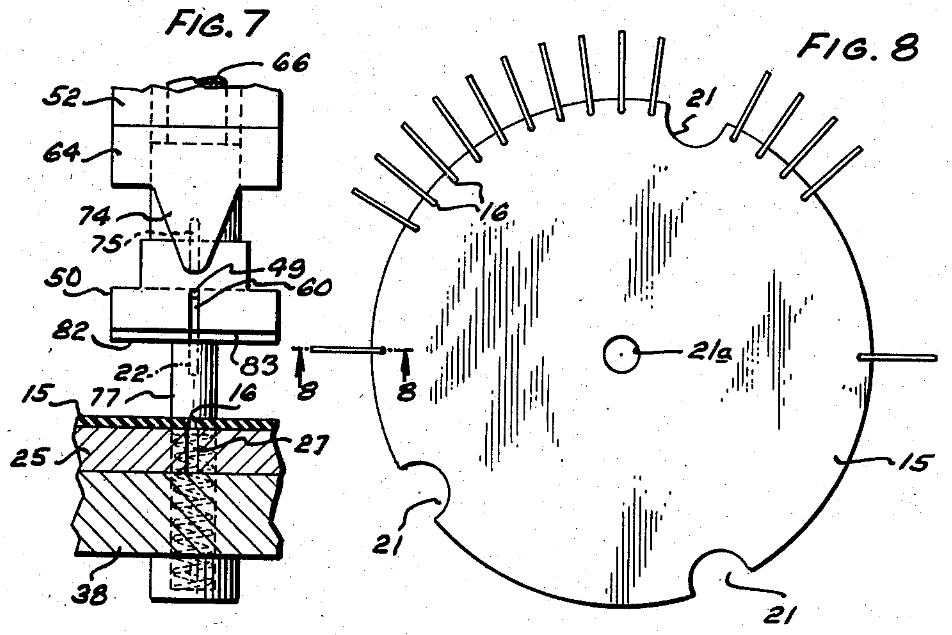
Fig. 7 is a fragmentary vertical sectional view of the device taken on the line 7—7 of Fig. 3.
Fig. 8 is a plan view of a printed wiring board with some of the terminals applied thereto.
Figure 9:
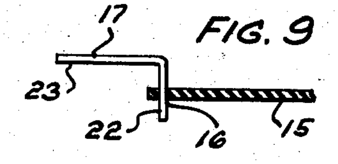
Fig. 9 is an enlarged vertical section though a portion of the board taken on line 9—9 of Fig. 8 and showing a terminal applied thereto.

Referring to Figs. 8 and 9 of the drawings, 15 represents a circular printed circuit board having perforations 16 along its margin into which L-shaped terminals 17 are driven by the present device 20. Each of the boards 15 has a plurality of semi-circular notches 21 in its margin and has a central aperture **21*a*. The L-shaped terminals have relatively short vertically disposed legs 22 which are driven into the perforations 16 in the circuit board and horizontally disposed legs 23** to which conductors may be connected.

Figure 6:
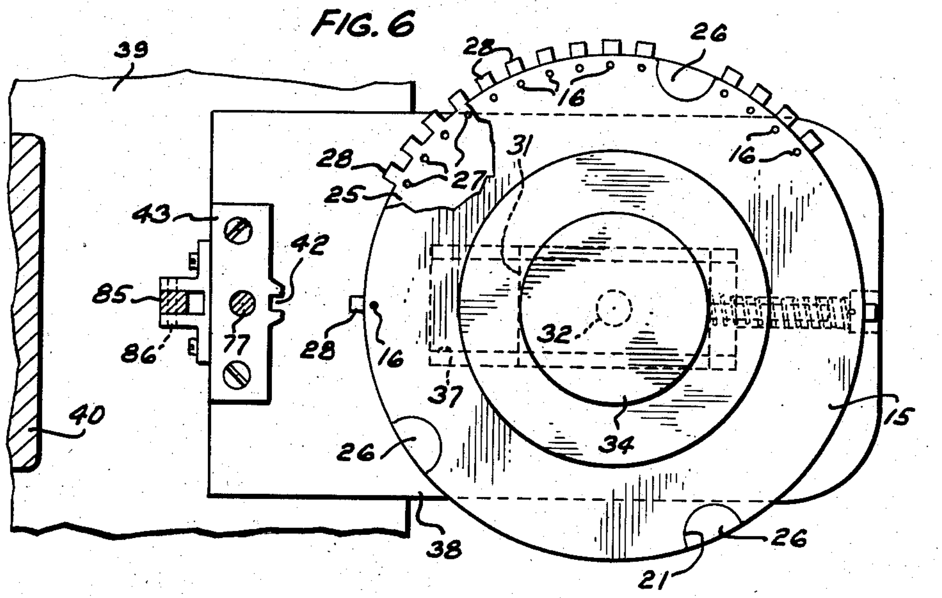
Fig. 6 is a fragmentary plan sectional view of the device taken on line 6—6 of Fig. 1.

The device 20 comprises a carrier 25 (Figs. 1, 2, and 6) in the form of a disc which supports the circuit board 15 on the upper surface thereof and which has a plurality of upwardly directed marginal projections 26 engageable in the notches 21 of the circuit board for locking the board against relative lateral movement. A plurality of vertical clearance apertures 27 for the terminal legs 22 are provided in the carrier 25 and a plurality of aligning lugs 28 extend radially from the periphery thereof in angularly spaced relation to each other corresponding to the angular spacing of the perforations 16 in the circuit board.

The carrier 25 is mounted on a slide 31 for rotation thereon about a vertical stud 32 secured to the slide. A clamping member 34 having a threaded recess 35 engageable with the threaded upper end of the stud 32 is provided for removably securing the circuit board 16 to the carrier. The slide 31 is mounted for horizontal movement to and from a retracted position (Fig. 6) and a forward operative position (Fig. 2) in a rectangular slideway 37 in a horizontally disposed frame plate 38 which is secured to a base portion 39 of a C-frame 40 of the device. With the carrier 25 in its retracted position a circuit board 15 may be applied thereto or removed therefrom, and in its forward or operative position a selected aligning lug 28 of the carrier engages in a cooperative aligning notch 42 of a positioning gage 43 fixedly mounted on the spring plate 38 to locate the circuit board with the selected perforation 16 in a predetermined position for receiving a terminal 17. The carrier 25 with the circuit board thereon is yieldably maintained in its forward operative position by a spring 45 which is mounted in a bore 46 in the frame plate 38 and engages the slide 31.

Figure 1:
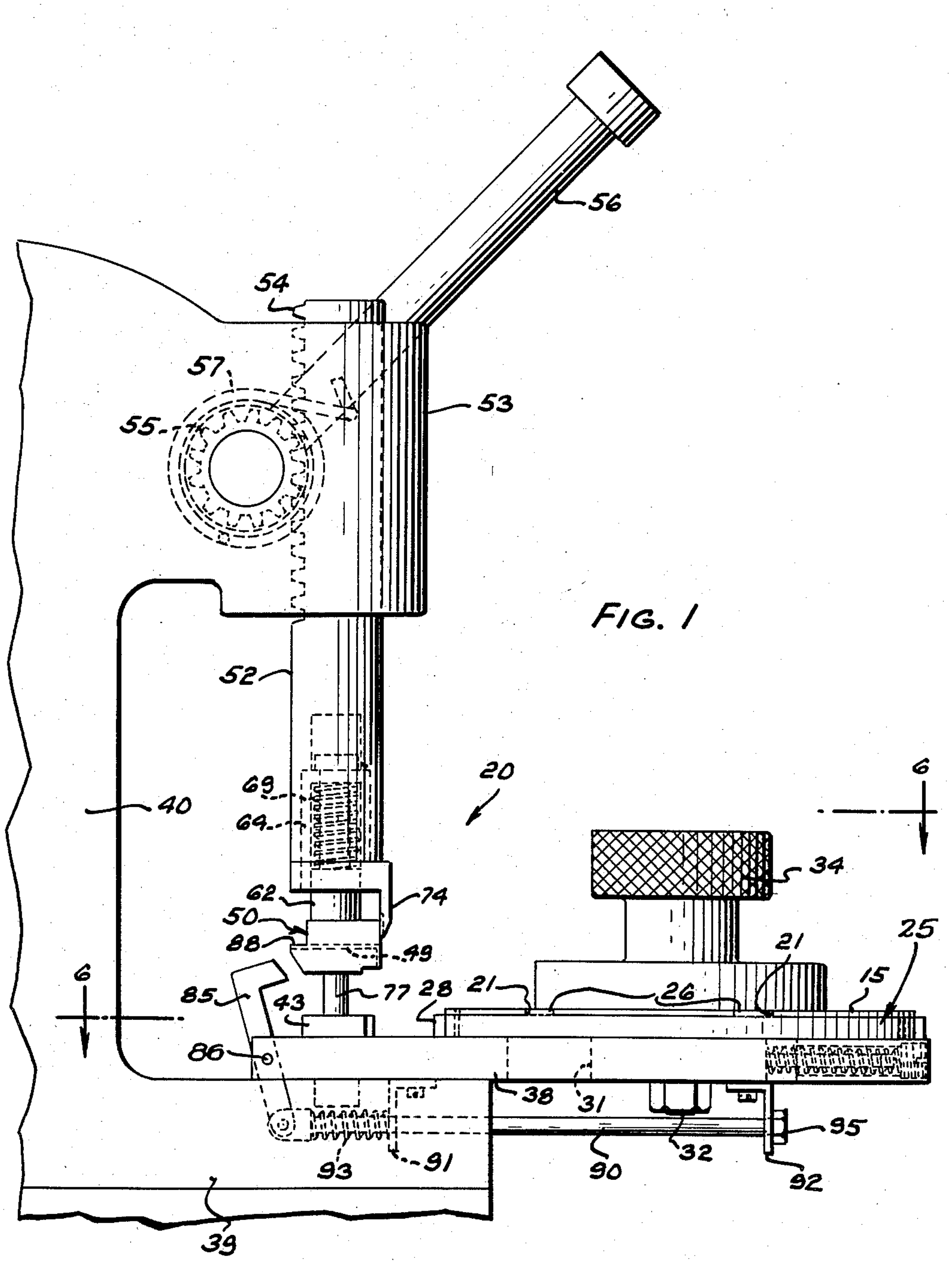

The leg 23 of the terminal 17 is adapted to be inserted in an aperture 49 in a driving head 50 which is mounted on a ram 52 for movement therewith and for limited movement relative thereto. The ram is mounted slidably in an upper portion 53 of the C-frame 40 and has gear teeth 54 formed thereon which mesh with a gear 55 rotatably mounted in the upper portion 53 of the C-frame 40 and has gear teeth 54 formed thereon which mesh with a gear 55 rotatably mounted in the upper portion 53 of the frame. The gear is connected to a handle 56 which is manually actuated to drive a terminal into the circuit board and a torsion spring 57 serves to return the handle 56 and the ram 52 to a normal upper position as shown in Fig. 1.

The driving head 50 has a flat vertical face 59 on one end thereof in which is formed a substantially semicylindrical groove 60 (Figs. 3 and 7) extending vertically downwardly from the end of the horizontal aperture 49.

Figure 2:
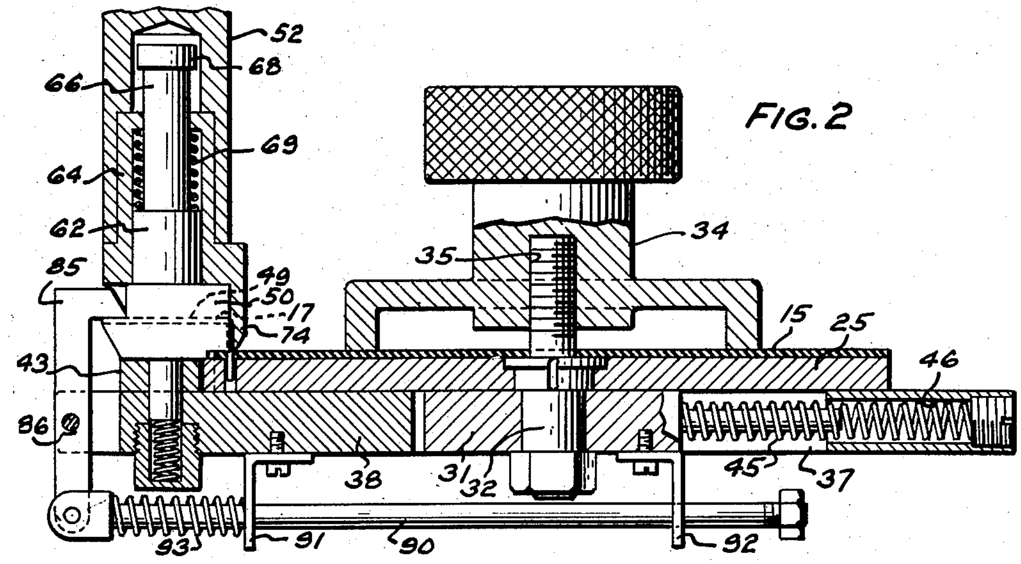
Fig. 2 is an enlarged fragmentary vertical longitudinal sectional view of the device showing parts of the device in another position and with the terminal driven into the circuit board.

When the terminal 17 is applied to the driving head 50 the vertical leg 22 of the terminal is seated in the groove 60 and is positioned thereby in vertical alignment with a perforation 16 in the circuit board 15 in which the terminal is to be applied when the circuit board and the carrier 25 are in operative position (Fig. 2). Extending upwardly from the driving head 50 is a shank having a cylindrical portion 62 which is mounted slidably in a bore 63 of a sleeve 64 which is pressed into a counterbored recess 65 in the lower end of the ram 52 and forms a part thereof. The upper reduced portion 66 of the shank extends upwardly through an aperture 67 in the end of the sleeve 64 and has a collar 68 pinned thereto which is movable vertically in the upper reduced portion of the counterbored recess 65. The collar 68 serves to limit the downward movement of the driving head 50, to which movement is imparted by a spring 69 disposed between the end of the sleeve inserted 64 and the enlarged shank portion 62. The lower surface 71 of the sleeve 64 forms an abutting surface of the ram 52 which is engageable with the horizontal upper surface 72 of the driving head 50 for imparting movement to the head 50 for driving the terminal into the circuit board.

Figures 3, 4, 5:
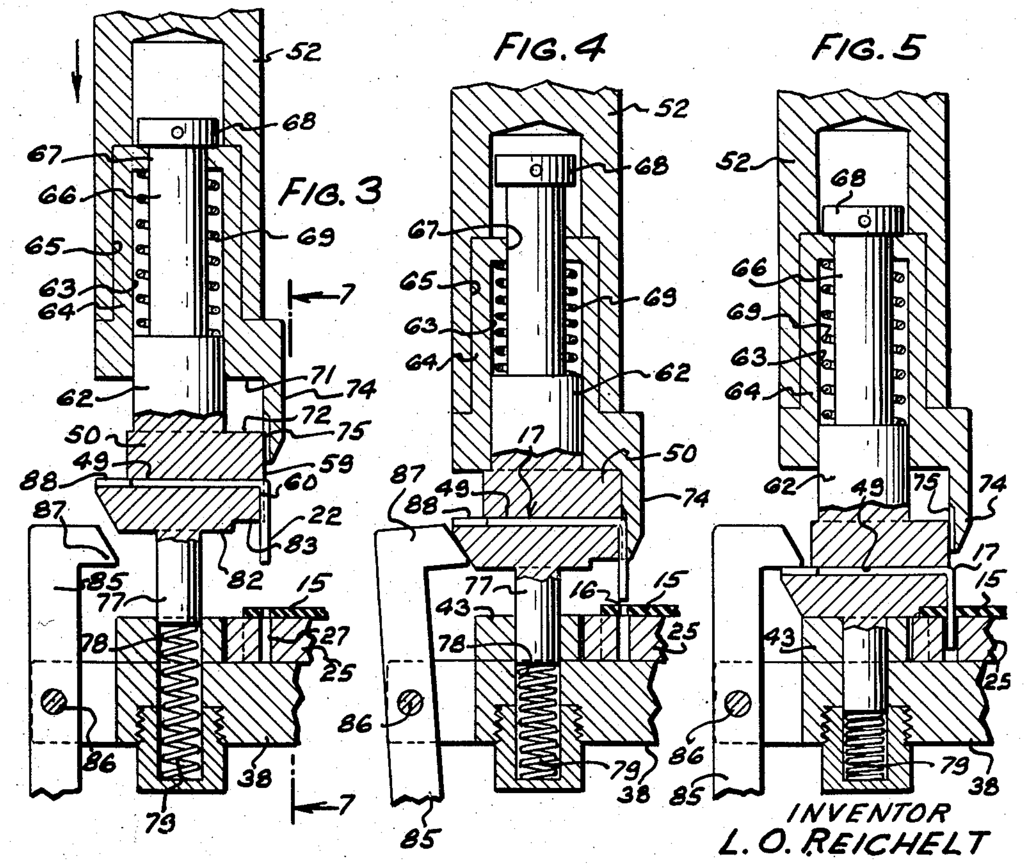
Fig. 3 is an enlarged fragmentary view of the device showing the ram and the terminal driving head in raised position.
Fig. 4 is a vertical view similar to Fig. 3 showing the ram and the driving head with a terminal therein in an intermediate position.
Fig. 5 is a view similar to Figs. 3 and 4 showing the terminal inserted in the circuit board and the driving head latched in its lower position and the ram moved upwardly to uncover the terminal.

In order to maintain the terminal 17 in the driving head with the leg 22 thereof in coaxial alignment with the selected perforation 16 in the circuit board, a downwardly projecting retaining or positioning finger 74 is provided on the sleeve 64. This finger has a flat face slidably engageable with the flat face 59 of the driving head 50 and has a vertically disposed substantially semicylindrical groove 75 for receiving the leg 22 of the terminal 17. It will be noted that a predetermined portion of the vertical leg 22 of the terminal 17 extends downwardly below the driving head 50 and is driven into the circuit board. In response to downward movement of the ram relative to the driving head, the retaining finger 74 moves down over the upper portion of the vertical leg 22 of the terminal which seats in the groove 60 and 75 and is held therein against lateral displacement or bending and in coaxial alignment with the perforation 16 of the circuit board. Extending downwardly from the head 50 is a rod 77 which fits in a bore 78 formed in the gage member 43 and the frame plate 38 and engages a spring 79 for yieldably resisting the downward movement of the driving head 50. With the ram 52 in its upper position as shown in Figs. 1 and 3 the locking finger 74 is in its raised position relative to the head 50 and uncovers the aperture 49 therein and permits the in insertion of the leg 23 of a terminal into the aperture 49 as shown in Fig. 3 and the seating of the leg 22 in the groove 60. The operator may then actuate the handle 56 to move the ram downwardly, during which movement the spring 77 will resist the downward movement of the driving head 50 and cause the spring 69 to compress and the ram 52 to move downwardly relative to the head until the end of the ram 71 engages the surface 72 of the head and the retaining finger 74 has moved into full engagement with the vertical leg 22 of the terminal to hold it against lateral displacement as shown in Fig. 4. Movement of the retaining finger 74 into locking relation with the vertical leg 22 of the terminal occurs before the lower end of the vertical leg 22 has reached the circuit board 15 so that by the time the end of the leg 22 of the terminal engages the circuit board and is driven into the perforations 16 therein, the upper portion of the leg 22 is enclosed and securely gripped in accurately aligned position by the retaining finger 74 and the head 50. The downward movement of the head and the ram is stopped by the engagement of the lower surface 82 of the driving head 50 with the upper surface of the gaging member 43 as shown in Fig. 5. A rabbet 83 on the lower portion of the driving head 50 provides clearance for the marginal portion of the circuit board 15 when the head is down at the end of its driving stroke.

Means are provided for latching the driving head 50 in its lowermost position at the end of its stroke to prevent its upward movement and the withdrawal of the terminal 17 from the circuit board before the terminal 17 is withdrawn from the driving head 50. For this purpose, a latch 85 is provided which is pivotally mounted on a pin 86 on the frame plate 38 and has a hooked end 87 engageable with a shoulder 88 on the driving head 50. At its lower end the latch 85 is pivotally connected to a rod 90 supported for horizontal movement in a pair of brackets 91 and 92 secured to the underside of the frame plate 38 and on the slide 31, respectively. A spring 93 on the rod 90 is rendered operable when the slide 31 is moved to its advanced position as shown in Fig. 2 to turn the latch 85 in a clockwise direction to operative position where it is actuated into locking engagement with the shoulder 88 on the driving head 50 as the head is moved to its lower position.

Thus, after the ram has been actuated to drive a terminal 17 into an aperture 16 in the circuit board, and the handle 56 has been released, the torsion spring 57 will move the handle 56, the ram 52, and the locking finger 74 upwardly a limited distance to disengage the retaining finger 74 from the terminal 17 while the driving head 50 is held against upward movement by the latch 85 as shown in Fig. 5. The operator may then engage the clamping member 34 and move the carrier 25 to its retracted position to withdraw the terminal 17 from the driving head 50, whereupon the bracket 92 on the slide 31 will engage a collar 95 on the rod 90 and actuate the rod and the latch 85 to release the driving head 50 and permit it and the ram 52 to be raised to their upper position as shown in Fig. 1.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for inserting dual-legged terminals into printed circuit boards, a head having an aperture for receiving one leg of the terminal and having a groove disposed transversely of the aperture for receiving the other leg of the terminal, a carrier for supporting a circuit board, mounting means for supporting the head for movement along a path parallel to the groove therein and for supporting the carrier for movement parallel to the aperture in the head to an operative position to dispose the circuit board in a predetermined position for receiving the other leg of the terminal, means for actuating the head to drive the other leg of the terminal into the circuit board, means for latching the head at the end of its driving stroke to prevent the head from being retracted before the terminal is withdrawn therefrom, and means for releasing the latching means to permit the head to be retracted.

2. In a device for inserting L-shaped terminals into perforated printed circuit boards, a head having an aperture for receiving one leg of the terminal and having a groove disposed perpendicular to the aperture for receiving the other leg of the terminal, a carrier for supporting a circuit board, mounting means for supporting the head for movement along a path parallel to the groove therein and for supporting the carrier for movement parallel to the aperture in the head from a loading position to an operative position to dispose the circuit board in a predetermined location for receiving the other leg of the terminal, means for actuating the head to drive the other leg of the terminal into the circuit board, a latch for holding the head at the end of its driving stroke to prevent the head from being retracted before the terminal is withdrawn therefrom, and means operable in response to movement of the carrier to its loading position for actuating the latch to release the head after the terminal has been withdrawn therefrom.

3. In a device for inserting L-shaped terminals into perforated printed circuit boards, a head mounted for movement in a predetermined path and having an aperture disposed transversely of said path for receiving one leg of the terminal and having a surface engageable with the other leg of the terminal for positioning it parallel to said path, a carrier for supporting a circuit board, mounting means for movably supporting the carrier and the head in predetermined relation to each other and for movement of the carrier in a direction parallel to the aperture in the head to an operative position with a perforation of the circuit board located to receive the other leg of the terminal, means for actuating said head through a driving stroke to drive the other leg into the circuit board, a retaining member movable into engagement with the other leg of the terminal for holding it parallel to said path while it is being driven into the circuit board, means for moving the retaining member into engagement with the terminal during the driving stroke of the head and prior to the movement of the terminal into engagement with the circuit board and for moving the retaining member from the terminal after the terminal has been driven into the circuit board, means for latching the head at the end of its driving stroke to prevent the head from being retracted before the terminal is withdrawn therefrom and to permit the retaining member to be disengaged from the terminal, whereby said carrier may be moved from its operative position to withdraw the terminal from the driving head, and means for releasing the latching means to permit the head to be retracted.

4. In a device for inserting L-shaped terminals into printed circuit boards, a ram movable along a predetermined path, a head mounted on the ram for movement therewith through a predetermined stroke and for limited movement relative thereto along the said path to and from first and second positions and supported in said second position in operative engagement with the ram for actuation thereby in one direction, said head having an aperture disposed transversely of the path of movement thereof for receiving one leg of the terminal therein and having a positioning surface engageable with the other leg of the terminal, a retaining finger on the ram engageable with the other leg of the terminal when the head is in the second position on the ram and for disengaging the terminal to permit its removal when the head is in its first position, the positioning surface on the head and the positioning finger cooperating to hold the other leg parallel to the path of movement of the head, a carrier for supporting a circuit board for movement parallel to the aperture in the head to an operative position to receive the other leg of the terminal, mounting means for movably supporting the carrier and the ram, resilient means for moving the head on the ram to the said first position and yieldably maintaining it therein, means for actuating the ram to move the head with the terminal therein in said one direction to drive the second leg of the terminal into the circuit board, and means operable in response to actuation of the ram for effecting the movement of the head on the ram to its second position prior to the engagement of the terminal with the circuit board.

5. A device as defined in claim 4 including latching means for releasably holding the head at the end of its terminal driving stroke until the ram has been retracted relative thereto to the said first position and the retaining member has been disengaged from the second leg of the terminal whereby the carrier may be moved from the operative position to withdraw the terminal from the head, and means operable in response to movement of the carrier from the operative position for actuating the latching means to release the head after the terminal has been withdrawn therefrom.

6. In a device for inserting L-shaped terminals into perforated printed circuit boards, a ram movable along a predetermined path, a head mounted on the ram for movement therewith through a predetermined stroke and for limited movement thereon along said path to and from first and second positions and supported in said second position in operative engagement with the ram for actuation thereby in one direction, said head having an aperture disposed transversely of the path of movement thereof for receiving one leg of the terminal therein and having a groove disposed parallel to the said path of movement for receiving the other leg of the terminal therein, a member on the ram for engaging and holding the other leg in the groove when the head is in the second position and for disengaging the terminal to permit its removal when the head is in its first position on the ram, a carrier for supporting a circuit board for movement parallel to the aperture in the head to an operative position with a perforation of the board in the path of travel of the second leg of the terminal, mounting means for supporting the carrier and the actuator in predetermined positions and for movement relative to each other, resilient means for moving the head to its first position on the ram and yieldably maintaining it therein, means for actuating the ram to move the head with the terminal therein in said one direction to drive the second leg of the terminal into the perforation in the circuit board, and means operable in response to actuation of the ram for effecting the movement of the head to its second position on the ram prior to the engagement of the other leg of the terminal with the circuit board.

7. In a device for inserting L-shaped terminals into perforated printed circuit boards, a ram movable along a predetermined path, a head mounted on the ram for movement therewith through a predetermined stroke and for limited movement relative thereto along the said path to and from first and second positions and supported in said second position in engagement with the ram for actuation thereby in one direction, said head having an aperture disposed transversely of the path of movement thereof for receiving one leg of the terminal therein and having a groove disposed parallel to the said path for receiving the other leg of the terminal therein, a retaining member on the ram for engaging and locking the other leg in the groove when the head is in its second position and for disengaging the terminal to permit its removal when the head is in its first position on the ram, a carrier for supporting a circuit board for movement parallel to the aperture in the head to and from an operative position with a perforation of the board in alignment with the second leg of the terminal, mounting means for supporting the carrier and the ram for movement relative to each other, resilient means for moving the head on the ram to the said first position and yieldably holding it therein, means for actuating the ram in said one direction to move the head with the terminal therein through a driving stroke to drive the second leg of the terminal into the circuit board, resilient means mounted in the path of the head for effecting the movement of the head on the ram to its second position prior to the engagement of the terminal with the circuit board, latching means for releasably holding the head at the end of its driving stroke until the terminal has been withdrawn therefrom and to permit the ram to be retracted a limited distance relative to the head to the said first position and thus move the retaining member from the terminal whereby the carrier with the circuit board thereon may be moved from the operative position to withdraw the terminal from the head, and means for actuating the latching means to release the head after the terminal has been withdrawn therefrom.

8. In a device for driving L-shaped terminals into printed circuit boards having angularly spaced marginal perforations, a head having an aperture for receiving one leg of the terminal and having a groove disposed transversely of the aperture for receiving a portion of the other leg of the terminal, mounting means for supporting the head for movement along a path parallel to the groove in the head, a carrier for supporting a circular circuit board thereon with the angularly spaced marginal perforations in predetermined positions relative thereto, a slide mounted slidably on the mounting means for supporting the carrier for rotation thereon and for movement therewith from a retracted position to an operative position for disposing a circuit board thereon in a position to receive the terminal, cooperable gaging elements on the carrier and on the mounting means for angularly locating the carrier in predetermined positions and the perforations in the circuit board in the path of travel of the other leg of the terminal, means for actuating the head with the terminal therein to drive the other leg of the terminal into the circuit board, means for latching the head at the end of its stroke to prevent the head from being retracted before the terminal has been withdrawn therefrom, and means operatively connected to the slide and responsive to movement of the carrier to the retracted position for actuating the latching means to release the head after the terminal has been withdrawn therefrom.

9. In an article-inserting apparatus, a ram, a holder having a recess therein to accommodate an article, means for supporting said holder in an elevated position spaced from and in alignment with the ram, means on the ram cooperable with the holder to grip an article in the recess, a slide movable into alignment with the ram, means on the slide for gripping a work piece having an aperture formed therein to receive said article, a latch mechanism moved by the slide into position beneath the article holder, and means for advancing the ram to grip the article in the recess and advance the article holder past the latch to insert the article into the work piece whereby said latch retains the holder from movement back to the initial elevated position.

References Cited in the file of this patent

UNITED STATES PATENTS

| | | |
|---|---|---|
| 2,431,033 | Galper | Nov. 18, 1947 |
| 2,697,221 | Brayton | Dec. 21, 1954 |